United States Patent [19]

Hall, II

[11] Patent Number: 4,762,502

[45] Date of Patent: Aug. 9, 1988

[54] METHOD FOR CONCEALMENT AND ACCESS TO CONTROL PANEL FUNCTIONS

[75] Inventor: George R. Hall, II, Wickliffe, Ohio

[73] Assignee: The Babcock & Wilcox Company, New Orleans, La.

[21] Appl. No.: 921,552

[22] Filed: Oct. 21, 1986

[51] Int. Cl.⁴ .............................................. H01R 13/44
[52] U.S. Cl. ...................................... 439/144; 174/67
[58] Field of Search ......................... 339/44 R, 44 M; 439/892, 144, 142; 174/66, 67

[56] References Cited

U.S. PATENT DOCUMENTS 4,508,933  4/1985  Carvel .............................. 339/44 R
4,575,169  3/1986  Duplatre et al. ................. 339/44 M Primary Examiner—Eugene F. Desmond
Assistant Examiner—Paula A. Austin
Attorney, Agent, or Firm—Robert J. Edwards; Vytas R. Matas

[57] ABSTRACT

A cover for a portion of a control panel module is disclosed. The cover is pivotally attached to an edge of the control panel module and encloses a configuration plug for reprogramming purposes and other switches on the control panel module. The top surface of the cover can be utilized to support the cord which interconnects a reprogramming device to the configuration plug on the control panel module during the programming process. A projection is provided on the top surface of the cover to prevent the cord from slipping off of the cover when the reprogramming device is so interconnected.

4 Claims, 2 Drawing Sheets

METHOD FOR CONCEALMENT AND ACCESS TO CONTROL PANEL FUNCTIONS

TECHNICAL FIELD

The present invention relates generally a cover for a portion of a control panel module and more particularly to a control panel module cover which has unique features.

BACKGROUND ART

Electronic control panel modules are used in many applications, such as industrial process control. Typically, these control panel modules have control functions which require periodic reprogramming. These control functions may be located externally on the control panel module, internally within the module, or a combination of external and internal locations might be present on the module. If the control functions are located externally on the control panel module, the module might present a cluttered appearance and there might be confusion between primary and secondary functions shown thereon. In addition, there is always the possibility of the accidental tripping of the exposed functions. In contrast, if the functions are located internally within the control panel module, the possibility of electrical shock is always present when the module is opened for reprogramming purposes. In addition, when the module is opened, internal components within same can be easily damaged. And lastly, when the functions are located internally within the control panel module, there might be a problem in locating the function that requires reprogramming and the time required to locate the function might be excessive.

Because of the foregoing, it has become desirable to develop a cover for an external configuration plug used for reprogramming the control panel module. The cover should conceal the configuration plug when in the closed position and should readily support the cord attached to the reprogramming device when in the open position.

SUMMARY OF THE INVENTION

The present invention solves the problems associated with the prior art and other problems by providing a unique cover which encloses the configuration plug and other switches on a control panel module and which, when in the open condition, supports the cord attached to the reprogramming device. The cover is pivotally attached at one end to an edge of the module and its outside surface can be marked so as to identify the module. A projection is provided on the top surface of the cover at the other end of same. The projection is shaped so that its front surface coincides with the front edge of the cover and its rear edge is higher than the top surface of the cover and the top of the control panel module. In this manner, the rear edge of the projection acts as a finger engaging means so that the cover can be pivoted outwardly exposing the configuration plug and other controls. In addition, the top surface of the cover can be used to support the cord which is connected to the reprogramming device. In this manner, the cord is supported during the reprogramming process and is prevented from slipping off of the top surface of the cover by the projection.

DESCRIPTION OF THE PREFERRED EMBODIMENT

Figure 1:
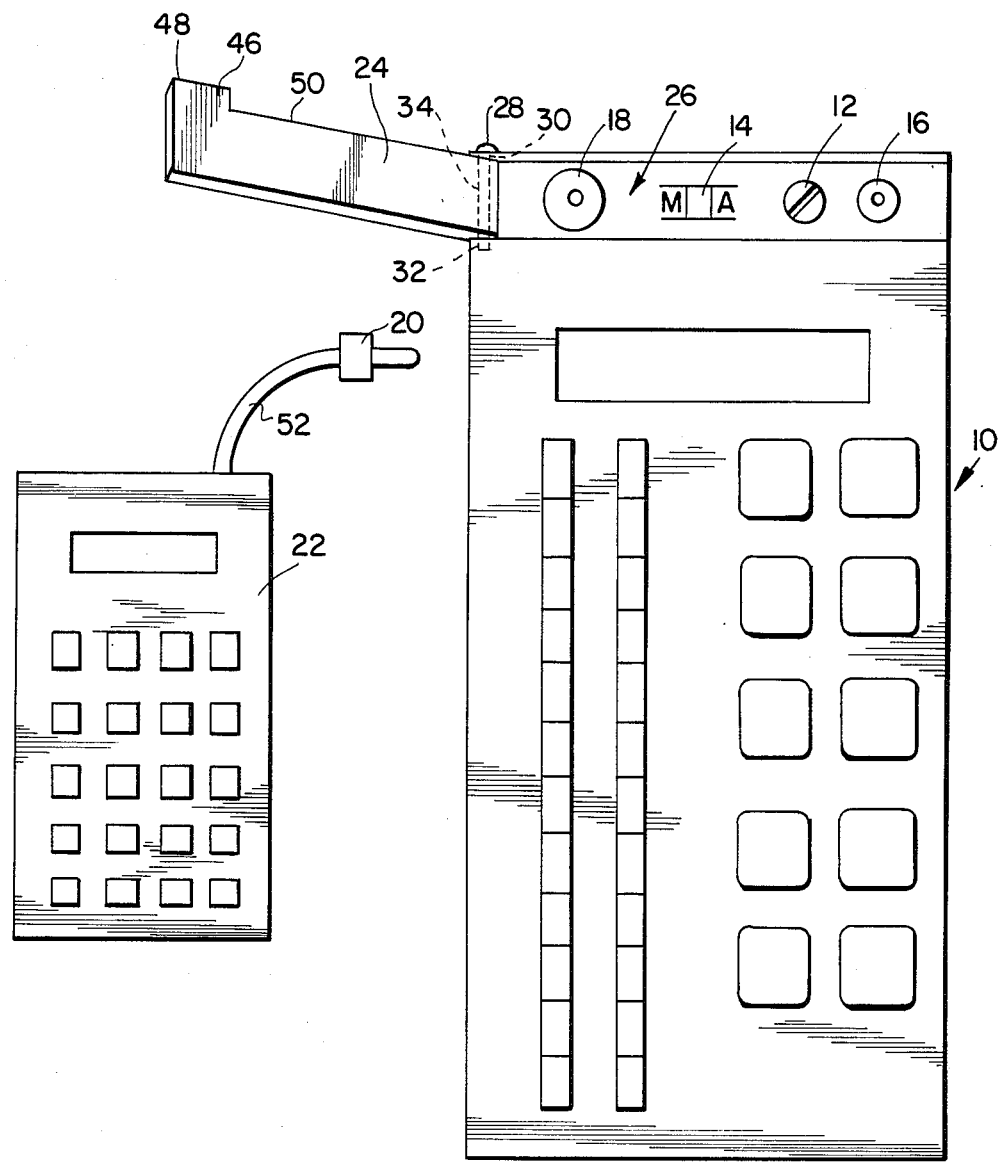
FIG. 1 is a front elevation view of a control panel module illustrating the present invention.

Referring now to the drawings where the illustrations are for the purpose of describing the preferred embodiment of the present invention and are not intended to limit the invention, FIG. 1 is a front elevation view of a control panel module 10 which can be readily installed in a mounting bracket (not shown). As such, the control panel module 10 can include a module mounting screw 12, a manual/automatic switch 14, a reset button 16 and a configuration plug 18. A mating plug 20 is attached to a device 22 that is utilized for reprogramming the control panel module 10 and is interconnectable with the configuration plug 18. In this manner, the control panel module can be reprogrammed in order to compensate for changed conditions. For example, if the control panel module 10 is a programmable controller, the set points of the controller can be recalibrated by operation of the reprogramming device 22.

Figure 2:
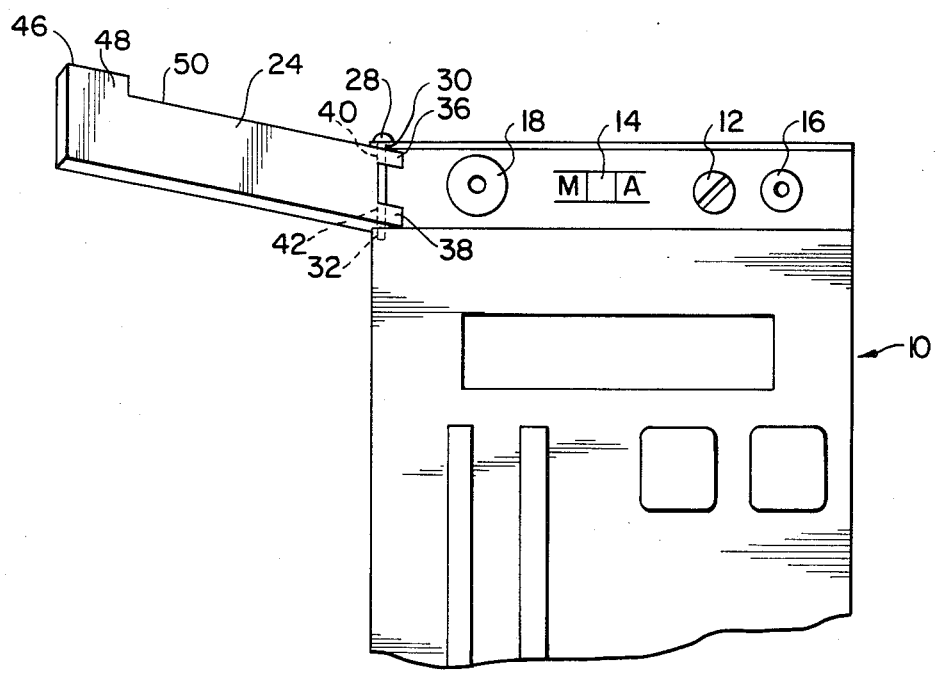
FIG. 2 is a partial front elevational view illustrating another arrangement for attaching the cover to the control panel module.

A cover 24, for concealing the area shown generally by the numeral 26, is shaped so as to enclose the module mounting screw 12, the manual/automatic switch 14, the reset button 16 and the configuration plug 18. The front surface of the cover 24 can be marked so as to identify the control panel module. The cover 24 is pivotally attached to the edge of the control panel module 10 through the use of a pin 28 which is received through oppositely disposed apertures 30 and 32 in the module 10 and a sleeve 34 which is formed in the end of the cover 24. It should be noted that sleeve 34 may be replaced by an upper boss 36 and a lower boss 38 with apertures 40 and 42 respectfully therein, as shown in FIG. 2. Alternatively, the control panel module 10 might have a complementary boss with an aperture therethrough (not shown) which is interposed between upper boss 36 and lower boss 38 forming a hinge arrangement. The same pin 28 could be utilized in any of the foregoing attachment configurations.

As previously stated, the cover 24 has a configuration complementary to that of area 26 so as to enclose same when the cover is closed. Generally, the cover 24 has a rectangular configuration and a projection 46 is provided on the top edge of the cover opposite the pivoted end. The projection 46 is shaped such that its front surface coincides with the front edge of the cover 24 and its rear edge 48 is higher than the top surfaces of the cover 24 and the control panel module 10. In this manner, the rear edge 48 of the projection 46 can act as a finger engaging means so that the cover 24 can be pivoted outwardly and inwardly about the pin 28 exposing and enclosing the configuration plug 18, the manual/automatic switch 14, the module mounting screw 12 and the reset button 16. In addition, the top surface 50 of the cover 24 can be utilized to support the cord 52 which connects the configuration plug 18 to the mating plug 20 on the reprogramming device 22. When the top surface 50 is used for such support, the projection 46 prevents the cord 52 from slipping off of the cover 24. Thus, the cover 24 is designed so as to support the cord 52 and prevent its slipping off of its supporting top surface 50 during the reprogramming process.

From the foregoing, it is apparent that this invention overcomes the problems associated with externally located control functions since it presents an uncluttered appearance and there is no confusion between primary and secondary functions. In addition, since the cover 24 covers the configuration plug 18, there is no possibility of the accidental tripping of exposed functions. This invention also overcomes the problems associated with internally located control functions since the interior of the module is never exposed and thus there is no possibility of electrical shock and the internal components cannot be damaged. In addition, since the configuration plug is readily available, there is no problem in reprogramming the module and the time required to accomplish same is minimized. Thus, in summary, the present invention offers numerous advantages over the prior art such as a functional appearance, ease of reprogramming, safety from accidental tripping of the functions, safety from electrical shock and protection from internal module entry. In addition, it provides the advantage of supporting the cord 52 for the reprogramming device 22 when it is connected to the configuration plug 18 on the control panel module 10. Furthermore, it prevents the cord 52 from slipping off of the cover 24 when the reprogramming device 22 is so interconnected.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. Apparatus for concealing and permitting access to a portion of a control panel module comprising a cover member pivotally attached to the control panel module and having a first position wherein said cover member encloses a portion of the control panel module and a second position wherein said cover member permits access to the portion of the control panel module, said cover member the control panel module, said cover member having a top surface for supporting a member which is interconnected to the control panel module and means for preventing the interconnected member from becoming disengaged from said supporting means.

2. The apparatus as defined in claim 1 wherein an end of said cover member is pivotally attached to an edge of the control panel module.

3. The apparatus as defined in claim 2 wherein said preventing means comprises a projection on said cover member, said projection being located adjacent an end of said cover member oppositely disposed from said pivotally attached end of said cover member.

4. The apparatus as defined in claim 3 wherein said projection is attached to the top surface of the cover member and has a front surface that coincides with the front edge of said cover member and a rear edge that is disposed from the rear edge surface of said cover member.

* * * * *